United States Patent [19]

Jullien et al.

[11] 4,028,178

[45] June 7, 1977

[54] SYSTEM FOR THE HEAT INSULATION OF HORIZONTAL CLOSURE SURFACES FOR A LIQUID METAL COOLED NUCLEAR REACTOR

[75] Inventors: René Jullien, Veurey-Voroise; Maurice Perona, Varces; Robert Venot, Fontenay-aux-Roses, all of France

[73] Assignee: Commissariat a l'Energie Atomique, Paris, France

[22] Filed: Sept. 5, 1975

[21] Appl. No.: 610,850

[30] Foreign Application Priority Data

Sept. 6, 1974 France .................. 74.30347

[52] U.S. Cl. .................. 176/38; 176/87; 176/DIG. 2
[51] Int. Cl.² .................. G21C 13/06
[58] Field of Search .................. 176/30, 38, 65, 87, 176/DIG. 2

[56] References Cited

UNITED STATES PATENTS

| | | | |
|---|---|---|---|
| 3,595,728 | 7/1971 | Robson | 176/87 X |
| 3,715,270 | 2/1973 | Jackson | 176/38 |
| 3,926,722 | 12/1975 | Dupen | 176/87 |
| 3,945,887 | 3/1976 | Lemercier | 176/87 |

Primary Examiner—Peter A. Nelson
Attorney, Agent, or Firm—Cameron, Kerkam, Sutton, Stowell & Stowell

[57] ABSTRACT

The system comprises an assembly of uniformly spaced horizontal plates extending parallel to a horizontal closure surface, an outer shell and a thick bottom plate suspended from the horizontal surface by means of spaced suspension members attached to the horizontal surface and to the thick plate respectively. The thick plate supports stacked metallic plates held in spaced relation and protected by a lateral shell which is capable of free expansion at the upper extremity and joined to said thick plate in leak-tight manner.

4 Claims, 4 Drawing Figures

SYSTEM FOR THE HEAT INSULATION OF HORIZONTAL CLOSURE SURFACES FOR A LIQUID METAL COOLED NUCLEAR REACTOR

This invention relates to a heat-insulation system which is primarily designed for use in a nuclear reactor of the liquid-metal cooled type in order to ensure thermal protection of the top closure surfaces of the reactor containment vault. In a reactor of this type, a metallic pressure vessel is placed within the reactor vault and contains the mass of liquid metal coolant, an inert gas atmosphere usually consisting of argon being present above the coolant. The closure surfaces mentioned above comprise in particular a horizontal concrete wall constituting the closure slab or containment vault roof proper, the surface of said concrete wall which is in contact with the inert gas being covered with a stainless steel base plate. The rotating shield plugs, which are components having the same structure as the reactor vault roof, occupy one of the openings formed in this latter and provide access to the reactor core within the pressure vessel.

In sodium-cooled fast reactors, it is also known that the temperature of the inert gas atmosphere which is present above the sodium is of the order of 500° C and that there are consequently formed in the inert blanket gas sodium vapors and aerosols which are liable to result in corrosion of the closure plates if no special precautions are taken. To these corrosion effects are added the effects of mechanical stresses arising from thermal gradients which develop within the structures.

In designs which are already known, thermal protection of the reactor vault roof is ensured by means of a covering attached to those portions which are directed towards the interior of the reactor vessel, the covering being constituted by metallic structures designed in the form of wire-fabric, trelliswork or gridwork elements stacked so as to form panels which produce an acceptable thermal gradient throughout the period of operation of the reactor. It must be expected in the long term, however, that a considerable mass of sodium will be condensed and retained within the cavities formed by the fibers of the heat-insulation system, thus giving rise to thermal short-circuits within a system of this type.

In other known designs which will be recalled in detail below, thermal protection of the rotating shield plugs is ensured by means of a stack of plates supported by a shell which is welded to the structure to be protected, clearance-spaces being provided between plates and supports in order to permit movements of expansion of the heat-insulation system with respect to said structure. While these expansions are of small magnitude in the case of small surface areas to be heat-insulated, they became considerable when these areas become larger, thus resulting in unacceptable deformations in the components to be protected.

This invention is directed to a heat-insulation system formed of material which affords resistance to corrosion by sodium, which is capable of ensuring thermal protection of the closure surfaces of the reactor containment vault throughout the period of operation of the reactor, and which overcomes the above-mentioned disadvantages such as sodium retention in the cavities of the heat-insulation material and considerable movements of expansion in the case of large surfaces to be heat-insulated.

With this objective, the system for heat insulation of said horizontal surfaces in contact with a gaseous medium constituted in known manner by an assembly of uniformly spaced horizontal plates extending parallel to said surfaces and a shell surrounding said plates is distinguished by the fact that the bottom plate of substantial thickness is suspended from said horizontal surfaces to be heat-insulated by means of suspension members disposed in spaced relation on the surface of said bottom plate and attached at the upper extremities thereof to said horizontal surfaces and at the lower extremities thereof to said plate of substantial thickness, and that said plate of substantial thickness supports a series of stacked metallic plates held in spaced relation by means of spacer members and protected at the periphery by lateral shells which are capable of free expansion at the top portions thereof and joined in leak-tight manner to said plate of substantial thickness so as to form an open-topped casing which completely surrounds said metallic plates.

In one particular embodiment, the heat-insulation system is distinguished by the fact that the suspension members are constituted by cylindrical rods extending through the stack of plates within a tube and that the upper extremity of each rod is inserted and welded in the component to be protected and the lower extremity of each rod which is rigidly fixed to the plate of substantial thickness is threaded and fitted with a nut for securing said rod to said plate of substantial thickness.

In the same embodiment, the bases of the outer shells which surround the stack of plates are welded to the plate of substantial thickness whilst the upper portions of said shells remain free to expand. Said shells can either be extended to the top level of the closure surface to be heat-insulated within the annular spaces existing between the different parts of the shield plugs as well as between the vault roof and said plugs or else can simply surround the heat-insulation system while permitting free expansion of the upper portion. In any case, by completely surrounding the system of anti-convection heat-insulating metallic plates within a casing proper which is open only at the top, the device according to the invention permits communication only at the cold top portion of the casing between the liquid-metal atmosphere and said heat-insulation system, thus preventing any condensation of said metal within said heat-insulation system.

Moreover, the heat-insulation system in accordance with the invention, which is particularly well suited to the insulation of rotating shield plugs and of the containment vault roof of a liquid-metal cooled reactor offers further advantages, especially from the point of view of technical design and construction. It is in fact possible to pre-mount the plates on the support plate which has previously been fitted with the tubes. The suspension members which can readily be manufactured in continuous production are inserted and welded within the structure to be protected. The pre-mounted assembly of the heat-insulation system is then brought beneath the structure, then lifted by means of jacks for example so as to introduce the suspension members into the tubes, all these operations being performed without displacing or reversing the reactor component. This is of particular interest in the case of components of substantial weight and size which do not permit of any displacement.

Further properties of the system will become apparent from the following description of exemplified embodiments which are given by way of indication without any limitation being implied, reference being made to the accompanying drawings, wherein.

Figure 1:
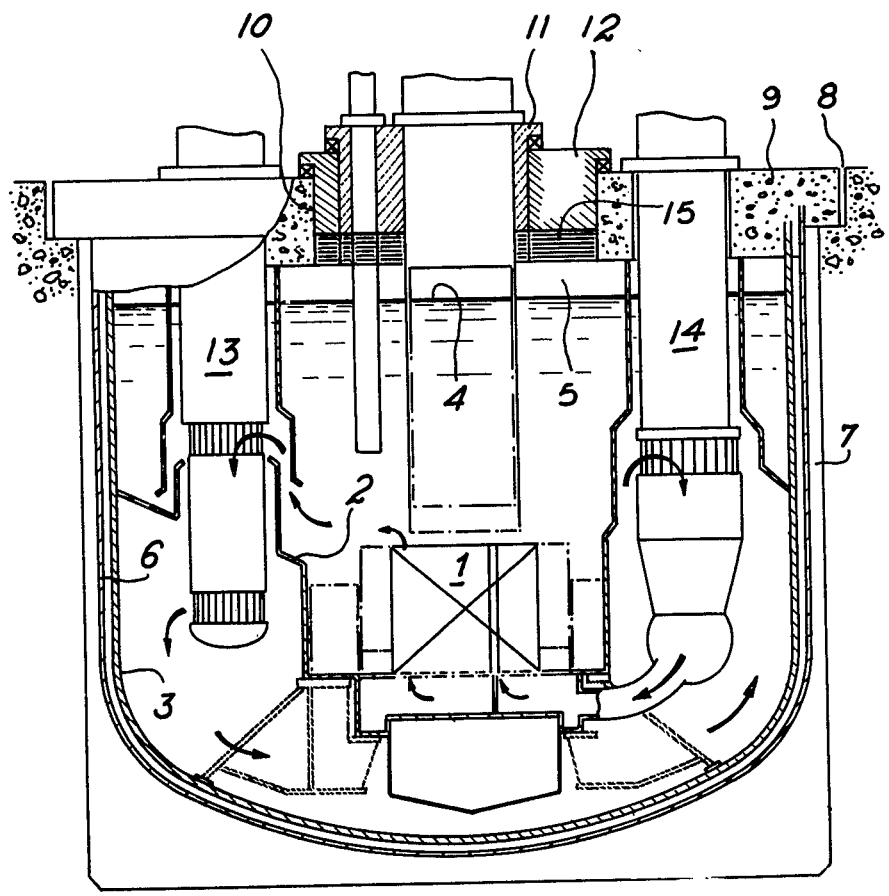
FIG. 1 is a diagrammatic axial sectional view of a liquid metal cooled nuclear reactor provided with the known system of two rotating shield plugs, the lower portion of which is equipped with the heat-insulation system in accordance with the invention.

In FIG. 1, the reference numeral 1 designates a fast reactor core immersed in a mass of liquid metal and especially sodium which serves to cool the reactor. The reactor core 1 is mounted within a so-called inner vessel 2 surrounded by a second vessel known as a primary vessel 3 which is open at the top and contains the liquid sodium to a level shown diagrammatically at 4. An atmosphere 5 of inert blanket gas usually consisting of argon is present above the liquid sodium. The primary vessel 3 is in turn surrounded by a safety vessel or so-called leak-jacket 6, the assembly formed by these two vessels having a common vertical axis being placed within an outer containment vault 7. The top portion of said vault is provided with a wide opening 8 in which is mounted a concrete vault roof 9. Said roof is provided with a central opening 10 for positioning a system consisting of two shield plugs 11 and 12 protected by a heat-insulation system 15 which is in contact with the blanket gas. Provision is made to give access to the reactor core 1 by permitting relative movements of rotation of said shield plugs.

The reactor vault roof 9 is provided in addition with passageways for mounting internal components such as pumps and heat exchangers which are necessary for the circulation of sodium, one component of each type being shown diagrammatically in FIG. 1; thus the reference 14 designates a pump and the reference 23 designates a heat exchanger.

Figure 2:
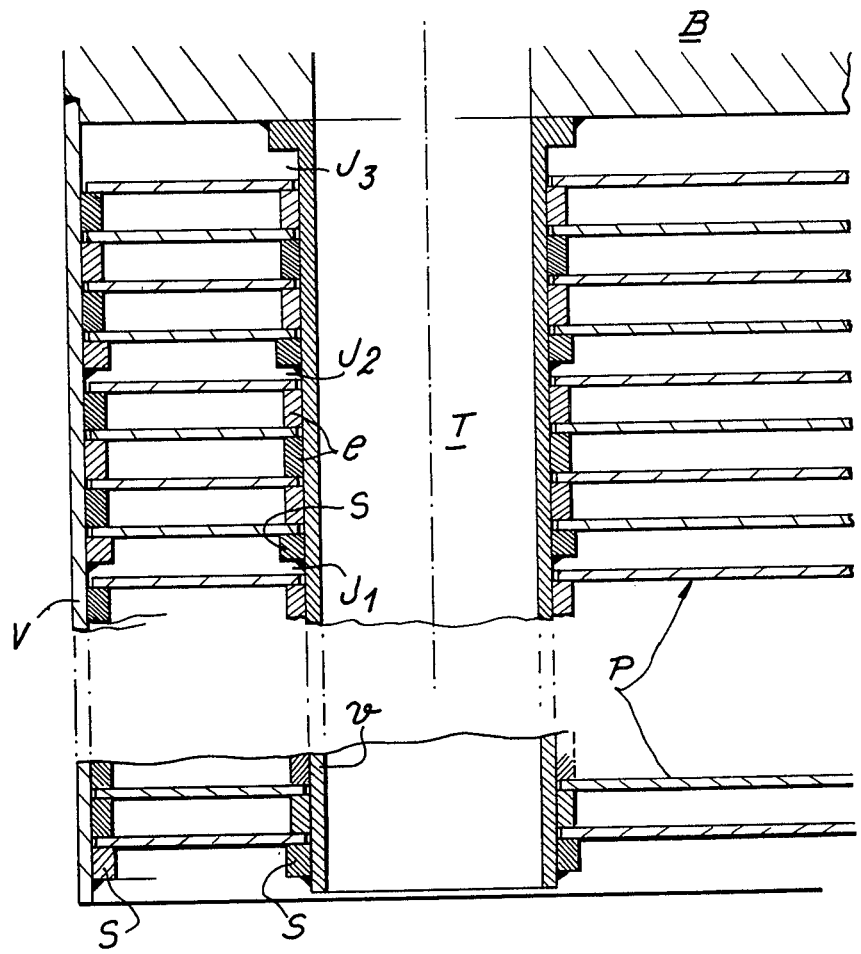
FIG. 2 is a diagrammatic axial sectional view to a larger scale showing the plate-type heat-insulation system in accordance with the prior art as described in the foregoing.

FIG. 2 shows to a larger scale the structural detail of the plate type system for heat insulation of horizontal surfaces in accordance with the prior art.

This system covers the bottom surface of the structure B to be heat-insulated and comprises horizontal plates P supported by shells such as those designated by the references v and V. Said shells define compartments or passageways T for a number of different components which are placed within the reactor vessel, said plates being carried on supports S which are welded to said shells. Said plates P are separated from each other by spacer members e placed against the shells v and V, spaces such as $j_1, j_2, j_3$ being provided between series of stacked plates. The upper extremities of the shells v and V which surround the plates P are welded at the upper extremities thereof to the structure B to be protected and are free at their lower extremities.

In this particular example, the plates of the heat-insulation system which are subjected to high thermal stresses undergo expansion during reactor operation, thus giving rise in particular to deformation of the supporting shells. Although these expansions are of small magnitude in the case of small areas to be heat-insulated, they increase to a considerable extent as soon as it becomes necessary to protect larger surfaces; this is the case whenever consideration is given to reactors of larger size in which the number of passageways for the various components remains substantially the same and calls for heat-insulation of larger surface areas between said passageways to be heat-insulated. Moreover, in the case of large surface areas to be heat-insulated, the weight carried by the shells become very great and gives rise to problems of mechanical stresses at the level of the welded joint between the shells and the structures to be protected.

In the same example of construction, the shells such as v and V which are also subjected to thermal stresses are capable of expanding at their lower ends which are free and not closed. From this it accordingly follows that the bottom closure of the heat-insulation system is not leak-tight and sodium vapors are liable to be deposited on the plates, thus impairing the insulating properties of said heat-insulation system.

Figure 3:
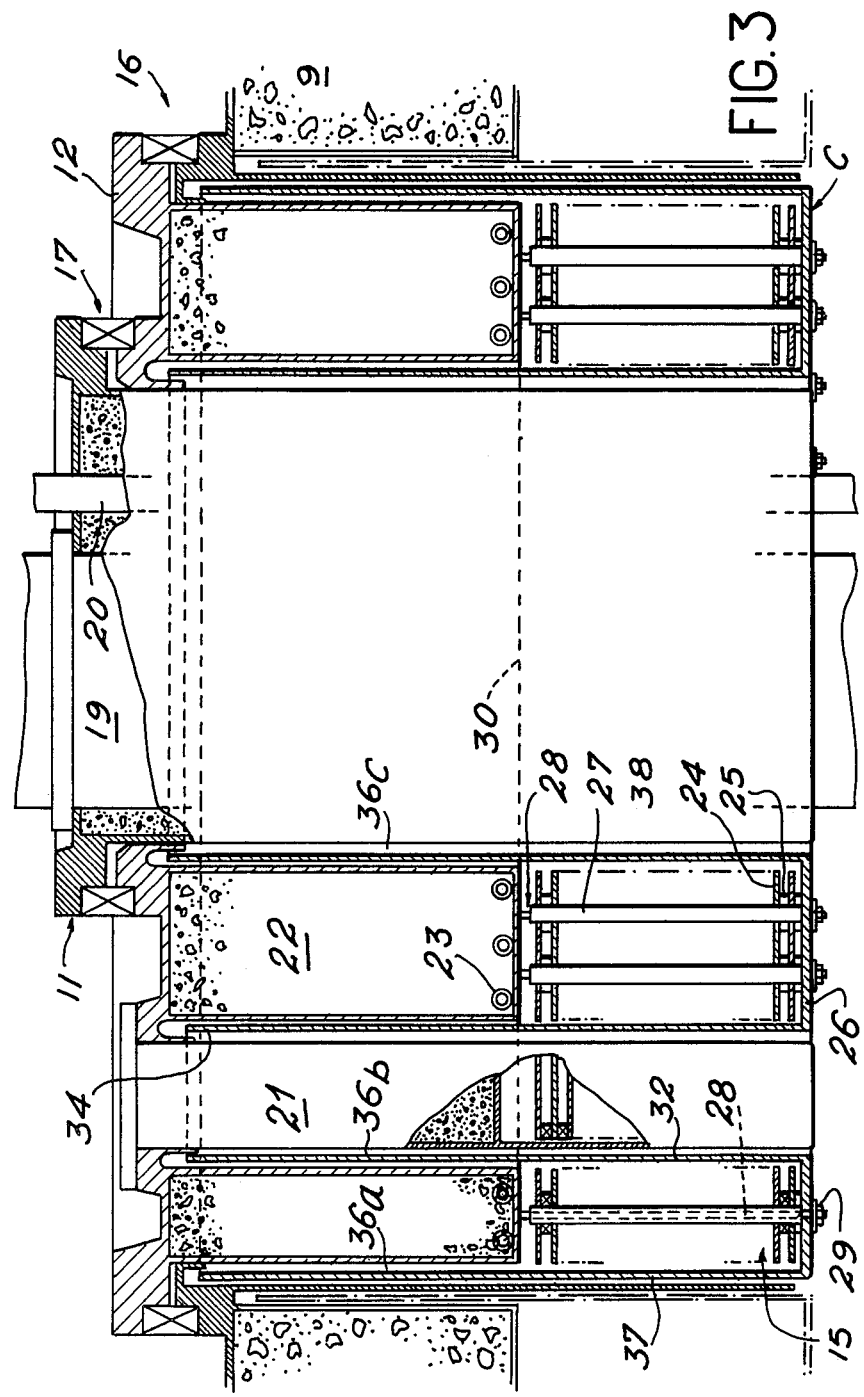
FIG. 3 is a diagrammatic axial sectional view to a larger scale showing the heat-insulation system of the rotating shield plugs shown in FIG. 1.

FIG. 3 is a view to a larger scale showing the structural detail of the heat-insulation system provided for the rotating shield plugs 11 and 12.

The large shield plug 12 is supported on the reactor vault roof 9 by means of thrust-bearings 16, the small shield plug 11 being in turn supported on said large plug 12 by means of thrust-bearings 17. The small rotating shield plug 11 is traversed in leak-tight manner by the reactor core closure plug 19 and a handling tool 20. The large shield plug 12 is provided with an opening or manhole which is useful in the event of maintenance or remedial work on the reactor core which, as shown in the figure, is closed during normal operation by a shield plug 21 having a similar structure to that of the two shield plugs 11 and 12. Said plugs 11 and 12 are essentially composed of two section: one section as designated by the reference 22 is constructed of concrete and cooled by water circuits 23 whilst the other section constitutes the heat-insulation system 15 in accordance with the invention.

The heat-insulation system aforesaid comprises an assembly of horizontal plates 24 separated from each other by spacer members 25, the bottom plate 26 being of greater thickness. The stack of plates is traversed by tubes such as 27, each tube being intended to contain a suspension member in the form of a cylindrical rod 28 fitted with a nut 29 at the lower end whilst the other end is welded to the surface 30 to be heat-insulated. Shells 32, 37 and 38 which are welded to the bottom plate 26 surround the assembly of anti-convection plates 24 and extend to a top level 34 of the structure to be protected within annular spaces such as those designated by the references 36a, 36b and 36c which are provided between the different parts of the shield plugs and also between the vault roof and the shield plugs.

In the configuration which is illustrated, the performance of the system described arises directly from the fact that the thick bottom plate 26 is suspended from the bottom concrete portion 38 of each shield plug 11 and 12 by means of the suspension members 28 and that the plates 24 are supported directly on said thick bottom plate 26 under the action of gravity. In the same configuration, the shells such as those designated by the references 32, 37 and 38 perform the function of thermal screens for the structures to be heat-insulated and at the same time form a labyrinth within the annular spaces 36a, 36b and 36c between said structures and the reactor vault roof 9, with the result that any deposition of sodium condensates within the heat-insulation system in accordance with the invention is made virtually impossible.

Figure 4:
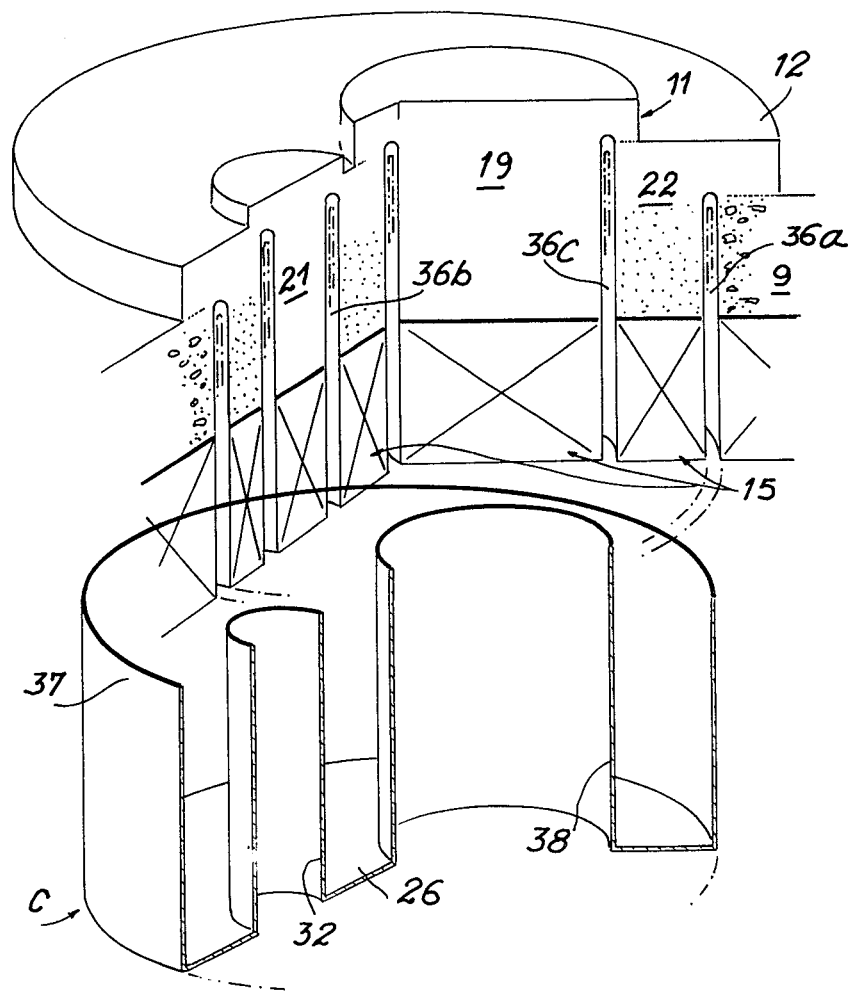
FIG. 4 is an exploded view in perspective showing diagrammatically the device of FIG. 3.

In order to complete the foregoing description, reference may usefully be made to FIG. 4 which is an exploded view in perspective of FIG. 3. This view is intended to show the general design of the open-topped casing C constituted by the plate 26 of substantial thickness which forms the bottom of the casing and by the shells 32, 37 and 38 which form the side walls of the casing. Said casing C thus completely surrounds and protects the heat-insulating structures located beneath the shield plugs while insulating them from the sodium vapors.

In the particular example described, the plates which are held in position by the tubes are of stainless steel having a thickness in the vicinity of 5 millimeters, the distance between said plates being governed by the spacer members and adapted as a function of thermal requirements. The heat-insulation system which is in contact with the hot gas expands to a greater degree than the colder structure to be protected and these relative displacements result in bending of the suspension members. If said bending movement becomes excessive, the stresses produced by said movement within the suspension members can be reduced on the one hand by increasing the number of members and on the other hand by reducing the thickness of these latter.

Finally, the shells 32, 37 and 38 are capable of expanding freely within the annular spaces 36a, 36b and 36c when subjected to high thermal gradients, thus removing the awkard problem of thermal stresses.

It is readily apparent that the invention is not limited to the example of construction which has been more particularly described with reference to the accompanying drawings and a number of design solutions for supporting a plate-type heat-insulation system can accordingly be devised without thereby departing either from the scope or the spirit of the invention.

What we claim is:

1. A system for the heat insulating of horizontal pressure vessel closure surfaces in a nuclear reactor with respect to a hot gaseous medium which is present within the pressure vessel, comprising a containment vault, a roof for said vault, rotatable shield plugs in said roof, substantially coplanar horizontal inner surfaces for said roof and said plugs, an assembly of uniformly spaced metallic plates including a bottom plate of substantial thickness extending parallel to said surfaces, a first vertical cylindrical shell surrounding said plates and entering said roof surface, second vertical cylindrical shells within said shell surrounding said plugs and entering said roof surface, said bottom plate of substantial thickness being suspended from said horizontal surfaces to be heat-insulated by means of suspension members disposed in spaced relation on the surface of said bottom plate and attached at the upper extremities thereof to said horizontal surfaces and at the lower extremities thereof to said plate of substantial thickness, said plate of substantial thickness supporting said metallic plates stacked one above the other by spacer members, said metallic plates being protected on the sides by said first shell, and said first and second shells being joined to said plate of substantial thickness in leak-tight manner for free expansion at the upper portion thereof.

2. A heat-insulation system according to claim 1, each suspension member including a cylindrical rod extending through the stack of plates within a tube.

3. A heat-insulation system according to claim 1, said free-expansion upper portion of said shells extending to the top level of said surface to be heat-insulated within annular spaced between said shield plugs and between said roof and said shield plugs.

4. A heat-insulating system according to claim 1, said free expansion upper portion of said shell terminating at the upper level of said metallic plates.

* * * * *